(No Model.)
2 Sheets—Sheet 1.

J. BUCKLEY.
CABLE LOGGING MACHINE.

No. 481,927. Patented Sept. 6, 1892.

(No Model.) 2 Sheets—Sheet 2.
J. BUCKLEY.
CABLE LOGGING MACHINE.

No. 481,927. Patented Sept. 6, 1892.

Witnesses:

Inventor,
John Buckley,
By his Attorneys,

UNITED STATES PATENT OFFICE.

JOHN BUCKLEY, OF EUREKA, CALIFORNIA.

CABLE LOGGING-MACHINE.

SPECIFICATION forming part of Letters Patent No. 481,927, dated September 6, 1892.

Application filed March 8, 1892. Serial No. 424,225. (No model.)

*To all whom it may concern:*

Be it known that I, JOHN BUCKLEY, a citizen of the United States, residing at Eureka, in the county of Humboldt and State of California, have invented a new and useful Cable Logging-Machine, of which the following is a specification.

My invention relates to a cable logging-engine; and it consists in the construction and arrangement of parts, as will be more fully hereinafter described and claimed.

The object of the invention is to dispense with the use of laid tracks for the purpose of having the ordinary form of locomotive run thereover and to substitute therefor a form of engine which will not be affected by difference in grade and will be guided in connection with a stationary cable.

Figure 1:
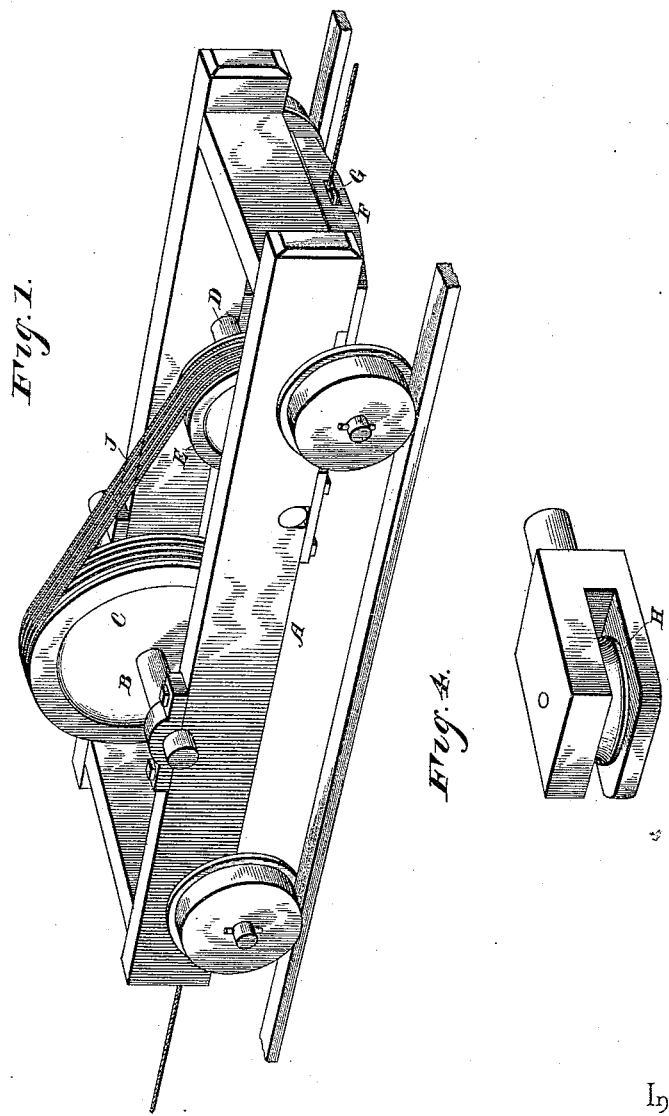
Figure 2:
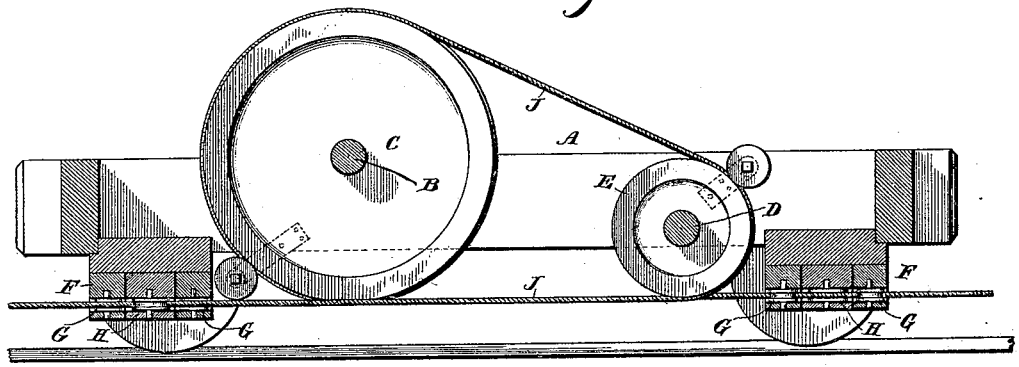
Figure 3:
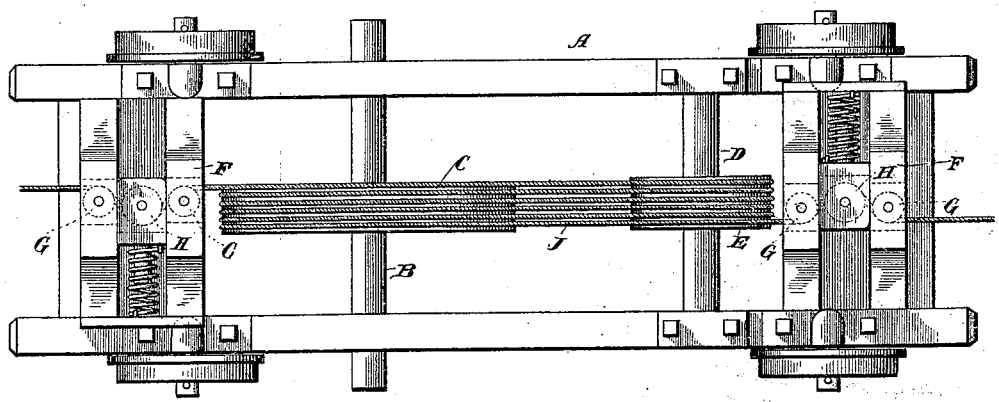

In the accompanying drawings, Figure 1 is a perspective view of a cable logging-engine embodying my invention and showing a portion of the track together with cable. Fig. 2 is a longitudinal vertical section of the engine. Fig. 3 is a retractile bottom plan view thereof. Fig. 4 is a detail perspective view of the automatically-operating sheave or pulley for taking up the slack in the cable.

In the drawings, A designates the frame of the engine, which is made sufficiently strong to support the mechanism and also to resist the strain of draft. Said frame is provided with wheels adapted to run on a suitable track, and may be either flanged or broad-tread wheels, as found desirable for different purposes.

In the frame A is mounted a transverse shaft B, on which is keyed a grooved pulley C. Adjacent to said shaft B and parallel therewith is a shaft D also having bearing in the frame A, and on which is fixed a grooved pulley E of smaller diameter than the pulley C.

In either end of the frame A, on the lower side thereof, is secured a lead F for the cable, and contains pulleys or sheaves G, over which the cable passes. This lead is formed with a central groove or slot in which is mounted a spring-actuated pulley-block or sheave H, moving transversely across the longitudinal line of the machine when in operation. It will be necessary to employ a device of this character at each end of the engine in order that it may be reversed and applicable for motion in either direction. The cable J passes through the blocks or sheaves H, and as slack occurs the spring-tension on the block or sheave will produce a taut condition of the cable and thereby prevent slipping of the same on the pulleys hereinbefore set forth. The cable J is stationarily fixed at its ends, as may be desired, and which will be in such position that one end is located at the place from which logs are desired to be transported to a suitable landing, at which the other end of the cable will be secured. It will be understood that the cable will be located between the rails of the track and will pass through the lead at the ends of the engine to the pulleys C and E, around which it is passed as many times as is necessary to obtain the required friction.

As shown in Fig. 2, smaller pulleys or tighteners, secured to the frame of the engine, may be used in connection with pulleys C and E to take up the slack in the cable which may occur between such pulleys, said smaller pulleys being carried by suitable hangers extending over the said pulleys C and E.

The pulley C is the driving-pulley, and to it is applied suitable power through its shaft, either by crank or motor, as may be desired, thereby actuating the cable which surrounds the same and causing the engine to move over said cable—that is, as the pulleys C and E revolve the cable is moved around the same and taken up as the engine moves over the track. It will therefore be seen that the movement will be regular and that grade will not effect the same. When the end of the road where the logs or load is to be deposited is reached, the load is disconnected, the movement of the pulley C reversed, and the engine moved backward to the place from which it started.

The advantage of this machine is that the wheels are not driven and therefore cannot slip. Further, when pulling a heavy load with this class of machine great speed is not required, and the necessary power for propulsion can be obtained from smaller engines.

To regulate the tension on the cable proportionate to the load to be drawn, the number of turns of the cable on the pulleys will be increased or decreased as the draft is proportionately increased or decreased.

The manner of attaching a load to either end of the engine will be accomplished as may be desired, and devices well known to those skilled in the art may be employed.

The usefulness of this form of engine will be readily apparent and need not be further set forth herein.

Having thus described my invention, what I claim as new is—

1. In a cable logging-engine, the combination of a frame, grooved pulleys carried thereby, one of which is the driving-pulley, a stationary cable, and reversely-situated tension devices at opposite ends of the engine for taking up the slack of the cable, substantially as described.

2. In a cable logging-engine, the combination of a frame mounted on wheels, grooved pulleys carried by said frame, one of which is the driving-pulley, a stationary cable, and a spring-actuated sheave or pulley through which said cable passes movable across the longitudinal direction of said cable to take up the slack therein, substantially as described.

3. In a cable logging-engine, the combination of a frame mounted on wheels, pulleys carried by said frame having grooves therein and one of which is the driving-pulley, a stationary cable secured at its opposite ends, leads at each end of said frame through which said cable passes, and reversely-situated tension devices at opposite ends of the engine adjacent to said leads for taking up slack in the cable, substantially as described.

4. In a cable logging-engine, the combination of a frame or support mounted on flanged wheels to engage a track, grooved pulleys differing in diameter and carried by said frame or support, one of which forms the driving-pulley, a lead at each end of said frame or support having pulleys therein over which the cable passes, and a spring-actuated movable sheave mounted in said lead to take up the slack of said cable, substantially as described.

5. In a cable logging-engine, the combination of a frame or support mounted on wheels, grooved pulleys carried by said frame or support, one of which is the driving-pulley, a stationary cable, and an automatically-operating sheave or pulley movable transversely across the line of and engaging said cable, substantially as described.

6. In a cable logging-engine, the combination of a frame or support mounted on wheels, grooved pulleys carried by said frame or support, one of which is larger than the other and forms the driving-pulley, a stationary cable engaged by said pulleys, tighteners in connection with said pulleys for taking up the slack of the cable passing thereover, a lead at each end of said frame or support having pulleys therein over which the cable passes, and a spring-actuated sheave mounted in said lead and engaged by said cable, substantially as described.

In testimony that I claim the foregoing as my own I have hereto affixed my signature in the presence of two witnesses.

JOHN BUCKLEY.

Witnesses:
HENRY SEVIER,
ROBERT DUFFY.